Jan. 29, 1929.  
M. TREPETA  
1,700,187  
LIFE SAVING ATTACHMENT FOR SUBMARINES  
Filed March 26, 1928  2 Sheets-Sheet 1
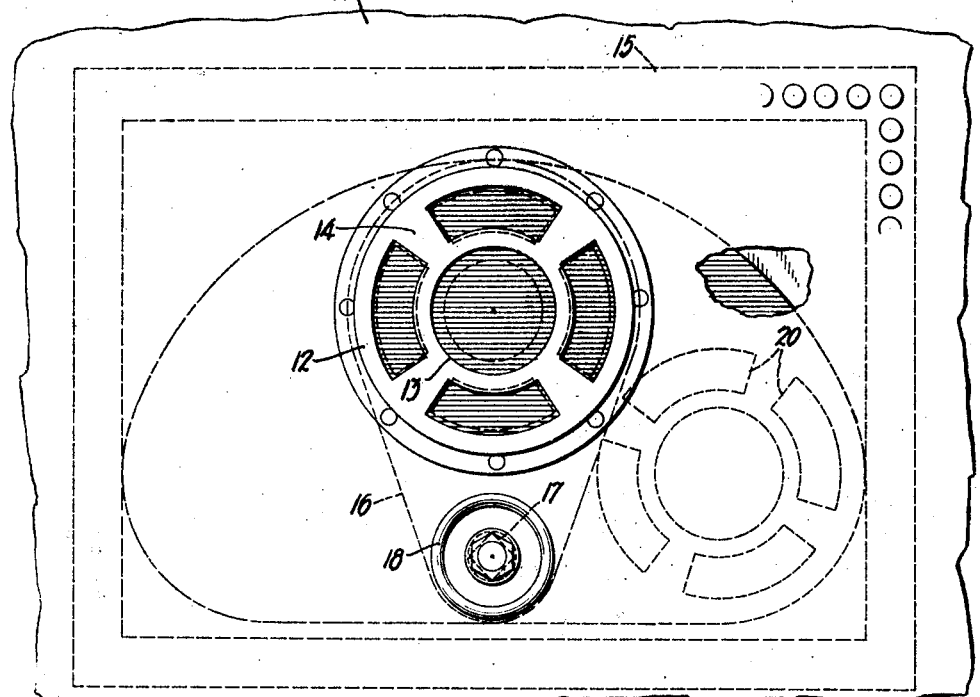
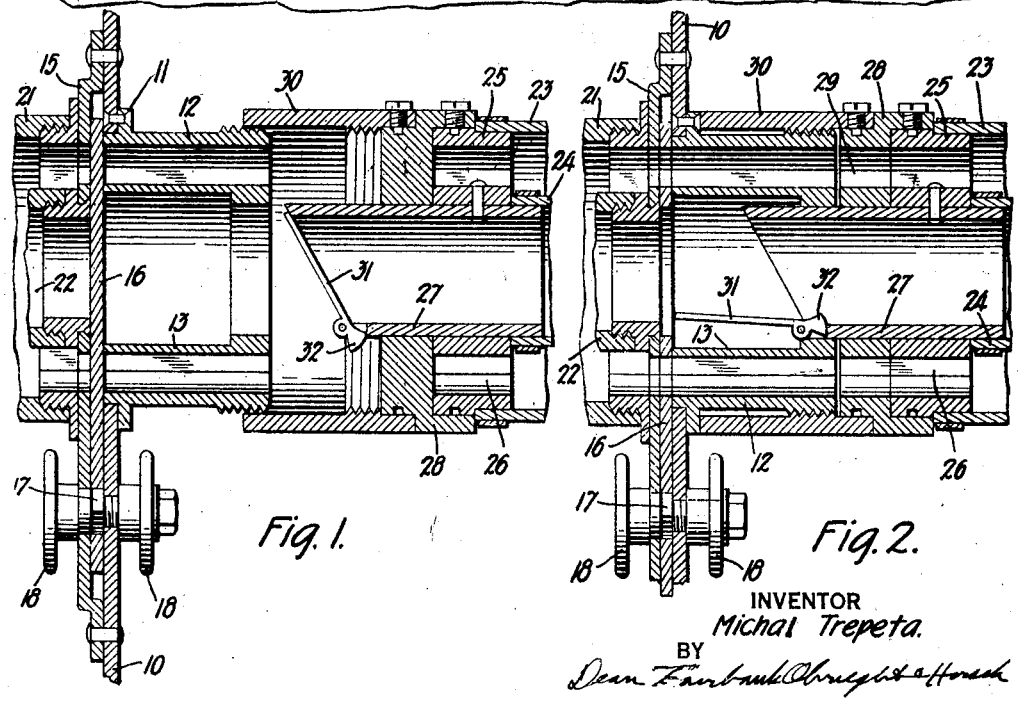
INVENTOR  
*Michal Trepeta.*  
BY  
ATTORNEYS

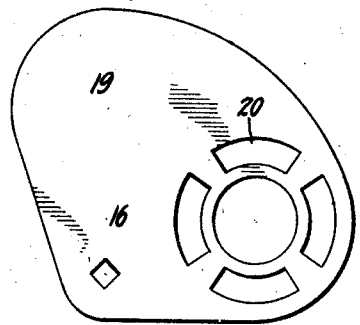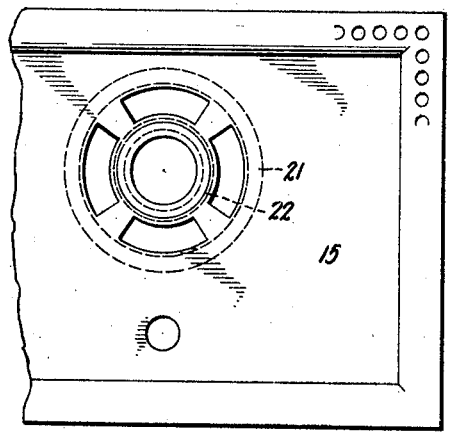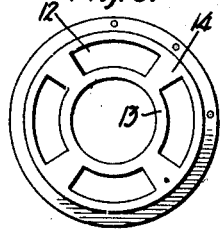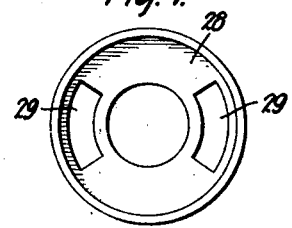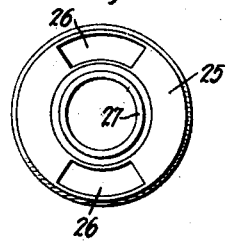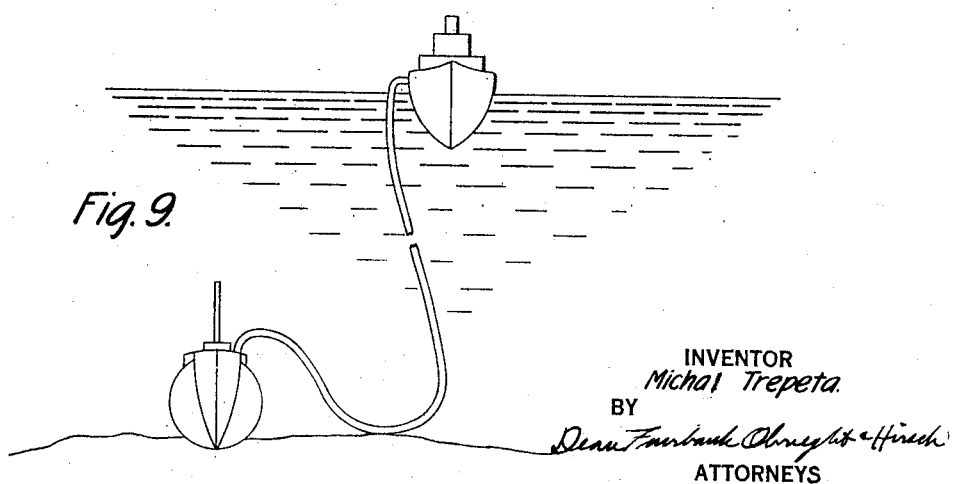

Patented Jan. 29, 1929.

1,700,187

UNITED STATES PATENT OFFICE.

MICHAL TREPETA, OF NEW ROCHELLE, NEW YORK.

LIFE-SAVING ATTACHMENT FOR SUBMARINES.

Application filed March 26, 1928. Serial No. 264,604.

The main object of the present invention is to facilitate the saving of lives of those within a submarine, which by reason of accident or other cause, is unable to rise to the surface. This is accomplished by the connection of a conduit to the submarine whereby air, water, liquid food, or other fluid may be delivered to the interior of the submarine.

In carrying out the invention the submarine is provided with a fixture on the wall thereof and to which a diver may connect a conduit, the fixture and the conduit being so designed as to prevent the entrance of water, but to permit the delivery of a fluid through the conduit to the interior of the submarine.

As one important feature, the fixture is so designed that it may be opened from either the interior or the exterior of the vessel when desired.

As another feature the fixture is so designed that it projects to the minimum distances from the wall to the interior and exterior of the submarine.

As another feature the conduit includes two concentric pipes which may be connected at the fixture to two concentric pipes within the submarine so that air or other fluid may be delivered through one pipe and vitiated air may escape through the other.

As another feature the conduit is provided with a type of valve which may be opened or closed by the oscillation of a valve member about the axis of the conduit as a center.

As another feature the conduit is provided with a valve for the inner pipe which will open automatically when the conduit is attached, and which will prevent the entrance of water while the end of the conduit is being conveyed to the submarine by the diver.

In the accompanying drawings, there is illustrated only one embodiment of my invention, but it will, of course, be understood that various changes may be made in the details of construction without departing from the spirit of my invention or the scope thereof as defined in the appended claims.

In these drawings:

Fig. 1 is a central longitudinal section through a portion of the submarine wall, the fixture carried thereby, and the end of the conduit, the fixture and conduit being shown in aligned, but separated position.

Fig. 2 is a section similar to Fig. 1, but showing the parts connected and the valves open.

Fig. 3 is an outside face view of the fixture, and a portion of the wall, the conduit being removed.

Fig. 4 is a face view of the inner member of the fixture.

Fig. 5 is a face view of the valve of the fixture.

Fig. 6 is an end view of the outwardly projecting member of the fixture.

Figs. 7 and 8 are end views of the two valve members of the outer pipe, and

Fig. 9 is a somewhat diagrammatic view indicating the purpose of the device.

In the specific embodiment illustrated, any suitable wall 10 of the submarine is provided with a fixture which includes an outwardly projecting boss 11 having a pair of concentric cylindrical walls 12 and 13 which may be held in spaced relationship by radial arms or partitions 14. The fixture also includes a wall 15 disposed closely adjacent to and parallel with the wall 10 of the submarine so as to form therebetween a space within which a valve member 16 may move. This valve member 16 is mounted on a pivot member 17 which latter has separate handles 18, one upon the outside and the other upon the inside of the submarine, whereby the valve member 16 may be caused to swing about this pivotal center and may be operated from either the interior or the exterior of the vessel. These handles may be of any suitable character which will permit operation by hand or by a wrench or other tool.

The valve member 16, as shown particularly in Fig. 5, has an imperforate portion 19 which may be brought into position to completely close the passages through the boss 11, and also has apertures 20 which may be brought into registry with all of the passages in the boss. In Fig. 1 the valve member is shown in closed position, and in Fig. 2 in open position.

Within the submarine the wall 15 may be provided with any suitable means for conveying the fluids entering the fixture to any portion of the submarine and withdrawing exhaust from any portion.

I have illustrated merely the end portions of two concentric conduits 21 and 22, but it will be obvious that the outer conduit 21, which is for the exhaust, may be omitted, if desired, and either or both of the conduits may be provided with branches leading to different compartments of the submarine.

It is not essential that these conduits be concentric for any distance beyond the portions connected to the fixture, and preferably they are not.

The apparatus also includes a conduit which may comprise two concentric pipes 23 and 24 approximating the diameters of the concentric walls 12 and 13 of the fixture. These pipes are connected to a collar 25 shown in Fig. 8 and constitutes one of a pair of valve members. This collar has a pair of openings 26 therethrough and a central pipe section 27.

Mounted to oscillate on the pipe section 27 and in engagement with the collar 25 is a second collar 28, shown in Fig. 7. This has a pair of apertures 29 similar to the apertures 26 of the collar 25, but the apertures are of such size and so positioned that upon oscillating the collar 28 which forms the other valve member, the apertures may be brought into or out of registry.

The collar or valve member 28 carries a second collar 30 which is rotatable in respect to the collar 28 and is provided with internal threads whereby it may be screwed on to the outer wall 12 of the fixture.

The inner pipe section 27 which projects through the two collars or valve members 25 and 28 is provided with a valve 31 which normally seats against the end of the pipe section and prevents the entrance of water to the inner pipe. This valve 31 is pivoted at one side of the pipe section and is provided with a projection 32 which engages the end of the inner wall 13 of the fixture when the conduit and fixture are brought together so as to force the valve 31 to open position.

In the operation of the device the fixture is normally closed, as shown in Fig. 1. The diver carries the end of the conduit with both the inner and outer pipes closed, and brings the end of the conduit into alignment with the fixture, as is also shown in Fig. 1. The two parts are slipped together, and the collar 30 is rotated to secure the end of the conduit to the fixture by means of the screw threads on the fixture and the collar 30.

During this engagement the inner valve 31 is automatically opened. The collar 30 in rotating turns on the collar 28 without rotating the latter or opening the outer valve.

After the parts are connected the collar 28 may be rotated to bring the passages of the valve members 25 and 28 into alignment, and either the diver or any one inside of the vessel may operate the valve 19 to open the passages in the fixture.

Thereafter air may be delivered through the inner pipe to any desired point within the submarine, and the exhaust gas may flow out through the outer pipe.

It will be noted that in connecting up the parts, it is merely necessary to rotate first the collar 30 and then the collar 28 and to operate the handle 18.

Air may be delivered through the inside pipe, or if desired, fresh water or liquid food may be delivered.

Having thus described my invention, what I claim as new and desire to secure by Letters Patent is:

1. The combination with a submarine having a fixture including a cylindrical boss, a conduit having a collar adapted to be secured to said boss, and a pair of cooperating valve members, one of them rotatable about the axis of the conduit for controlling the flow of fluid through said conduit.

2. The combination with a submarine having a tubular boss, a conduit having a pair of independently rotatable collars, one serving for connecting said conduit to said boss, and the other for controlling the flow of fluid through the conduit.

3. The combination with a submarine having a cylindrical boss, a conduit having two concentric pipe sections adapted to be secured to said boss, means for controlling the flow of fluid through the outer pipe section and a check valve in the inner pipe section.

4. The combination with a submarine having a cylindrical boss, a conduit having two concentric pipe sections adapted to be secured to said boss, a valve for controlling one of said pipe sections, and means for automatically opening said valve upon the attachment of said conduit to said boss.

5. The combination with a submarine having a fixture including two concentric cylindrical walls, a conduit including two concentric pipes, the inner pipe being adapted to telescope with the inner wall of said fixture, and means for securing the outer pipe to the outer wall of said fixture.

6. The combination with a submarine having a fixture including two concentric cylindrical walls, a conduit including two concentric pipes, the inner pipe being adapted to telescope with the inner wall of said fixture, means for securing the outer pipe to the outer wall of said fixture, and independent means for controlling the flow of fluid through said pipes.

7. The combination with a submarine having a fixture including two concentric cylindrical walls, a conduit including two concentric pipes, the inner pipe being adapted to telescope with the inner wall of said fixture, a valve for controlling the flow of fluid through the inner pipe, means for automatically opening said valve upon the attachment of the conduit to said fixture, and an annular valve encircling the inner pipe and rotatable around the latter for controlling the flow of fluid through the outer pipe.

8. The combination with a submarine of a fixture carried thereby and including two concentric cylindrical walls, a valve member slidable in a direction at right angles to the axis of the fixture for controlling the flow of fluid through said fixture, a conduit including two concentric pipes, and means for securing the outer pipe to the outer wall of the fixture with the inner pipe registering with the inner wall of the fixture.

9. The combination with a submarine of a fixture carried thereby and including a pair of concentric walls spaced to form concentric passages, a slide valve for controlling both of said passages, a conduit including a pair of concentric pipes, means for securing the outer pipe to the outer wall of the fixture, a valve rotatable about the inner pipe for controlling the flow of fluid through the outer pipe, a valve carried by the inner pipe, and means for automatically opening the last mentioned valve upon the connecting of the conduit to the fixture.

10. The combination with a submarine of a fixture carried by one wall thereof and having a pair of concentric passages, a slide valve movable parallel to said wall for controlling both of said passages, handle mechanism for said valve projecting to the interior and the exterior of the submarine, a conduit including a pair of concentric pipes, and means for connecting said conduit to said fixture whereby the inner pipe connects with the inner passage of the fixture, and the outer pipe with the outer passage of the fixture.

11. The combination with a submarine of a fixture carried by one wall thereof and including a pair of concentric cylindrical walls forming inner and outer passages, a slide valve movable parallel to said wall for controlling both of said passages, and means projecting to the exterior and interior of said wall for operating said valve.

12. The combination with a submarine of a fixture including a pair of concentric walls forming inner and outer passages, a conduit including inner and outer pipes, a valve for controlling the inner pipe, means connected to said valve for engaging with said inner wall to open said valve upon the connecting of the conduit to the fixture, and means for securing the outer pipe to the outer wall of the fixture.

13. The combination with a submarine of a fixture having two concentric passages, a conduit including two concentric pipe sections, the inner pipe section being adapted to telescope within the inner passage of the fixture, and means encircling the inner pipe section and rotatable in respect thereto for controlling the flow of fluid through the outer pipe section.

MICHAL TREPETA.